US008473435B2

(12) United States Patent
Ringer

(10) Patent No.: US 8,473,435 B2
(45) Date of Patent: Jun. 25, 2013

(54) USE OF GENERAL BAYESIAN NETWORKS IN OILFIELD OPERATIONS

(75) Inventor: Maurice Ringer, Cambridge (GB)

(73) Assignee: Schlumberger Technology Corporation, Sugar Land, TX (US)

( * ) Notice: Subject to any disclaimer, the term of this patent is extended or adjusted under 35 U.S.C. 154(b) by 591 days.

(21) Appl. No.: 12/720,009

(22) Filed: Mar. 9, 2010

(65) Prior Publication Data

US 2011/0225111 A1  Sep. 15, 2011

(51) Int. Cl.
*G06F 15/18* (2006.01)

(52) U.S. Cl.
USPC .......................................................... 706/14

(58) Field of Classification Search
None
See application file for complete search history.

(56) References Cited

U.S. PATENT DOCUMENTS

| | | |
|---|---|---|
| 5,010,789 A | 4/1991 | Brett et al. |
| 5,042,596 A | 8/1991 | Brett et al. |
| 5,090,492 A | 2/1992 | Keith |
| 5,113,953 A | 5/1992 | Noble |
| 5,163,524 A | 11/1992 | Newton, Jr. et al. |
| 5,265,682 A | 11/1993 | Russell et al. |
| 5,423,389 A | 6/1995 | Warren et al. |
| 5,520,255 A | 5/1996 | Barr et al. |
| 5,553,678 A | 9/1996 | Barr et al. |
| 5,553,679 A | 9/1996 | Thorp |
| 5,582,259 A | 12/1996 | Barr |
| 6,408,290 B1 | 6/2002 | Thiesson et al. |
| 6,826,486 B1 | 11/2004 | Malinverno |
| 7,128,167 B2* | 10/2006 | Dunlop et al. .................. 175/24 |
| 7,743,006 B2 | 6/2010 | Woronow et al. |
| 2002/0120401 A1 | 8/2002 | Macdonald et al. |
| 2008/0162099 A1 | 7/2008 | Vega Velasquez |
| 2010/0010744 A1 | 1/2010 | Prange et al. |

OTHER PUBLICATIONS

Russell et al, Artificial Intelligence: A Modern Approach, Prentice Hall, third Edition, 2009, pp. 510-539.*
International search report of international application No. PCT/IB2011/000421 dated Dec. 16, 2011.
Campbell et al: "Recognition of a hidden mineral deposit by an artificial intelligence program", Science, vol. 217, Sep. 1982, pp. 927-929.
Jensen: "Some references for normative systems", An introduction to Bayesian Networks, UCL Press Limited, London, 1996, pp. 4-6.
Jensen: "The oil wildcatter", An introduction to Bayesian Networks, UCL Press Limited, London, 1996, pp. 135-137.

* cited by examiner

*Primary Examiner* — Alan Chen
*Assistant Examiner* — Paulinho E Smith

(57) ABSTRACT

Embodiments of the present invention provide methods of using General Bayesian Networks to automate oilfield operations. In certain aspects, a Monte-Carlo method is used to propagate probability density functions for root-variables to continuous-valued hidden variables reflecting some oilfield operation properties. Evidence in the form of observed properties are used to weight samples used in the Monte-Carlo process thereby propagating the observed values onto other variables. The inferred probability distributions are provided to an oilfield control system or monitoring system.

12 Claims, 10 Drawing Sheets

US 8,473,435 B2

USE OF GENERAL BAYESIAN NETWORKS IN OILFIELD OPERATIONS

BACKGROUND

The present invention relates generally to automation of oilfield operations and more particularly to the use of General Bayesian Networks in the automation of oilfield operations.

Oilfield operations are data intensive operations with a myriad of measurements and functional relationships being available for observing and mathematically modeling, for example, conditions of operations, conditions of the operating environment, e.g., a wellbore, and conditions of equipment. Many sensors may be used to directly monitor the operations. As well as sensed conditions, other conditions may never be observed, either because it is impossible to directly measure such conditions, or because sensors are not available for a given job, i.e., the conditions are hidden.

Moreover, oilfield operations include processes and procedures that are often extremely expensive and dangerous. Equipment malfunctions may have dire effects both in terms of economic cost and in terms of operator and environmental safety. Inadequate interpretation of collected data may also cause the failure of achieving desired operational goals. It is therefore desirable to have tools for interpreting monitored oilfield data so as to provide accurate and timely feedback to control systems and operators both to optimize the results achieved and to avoid costly malfunctions.

One aspect of oilfield data is that often there are uncertainties in the data. Such uncertainties may reflect confidence in the measuring equipment, noise in the data or the like, thus, the measured data may be modeled as probability density functions reflecting the probability that certain variables have particular values.

Many functional relationships exist between properties of an oilfield operation, merely by way of example, surface weight on bit (SWOB) may equal the downhole weight on bit plus torsional friction.

Bayesian Networks are a tool that may be used to model systems that involve functional relationships between several variables modeled as probabilities of discrete states. A traditional Bayesian Network is a tool for estimating probabilities for discrete states of unknown variables of a system from functional relationships between the variables in the system. In such a network, the relationships between the variables are expressed as a table of conditional probabilities.

However, in addition to discrete states, many of the variables pertinent to wellbore procedures, including but not limited to drilling for oil or gas, are continuous-valued. Such would be the case for example for SWOB. In systems with continuous-valued variables, the value of a variable is a probability density function that is conditioned on the probability density functions of its parents and comes from a model that relates these variables. These models can take any form and are often not invertible. A Bayesian Network with continuous-valued variables is known as a General Bayesian Network.

The use of Bayesian Networks in oilfield operations has been described in U.S. Pat. Publ. No. 2007/0226158, "Bayesian Network Applications to Geology and Geophysics". That patent application provides for data analysis using Bayesian Networks to describe variables and relationships between variables, including accounting for uncertainties in the data.

While certain variables in a system may be observed by taking measurements, other variables may be hidden from observation. The variables that are hidden may be functionally related to the variables with measurable values. The values of hidden variables may be as important to interpretation of an industrial operation as are the values of observed variables. It is therefore desirable to have a mechanism for determining values for the hidden variables.

In a General Bayesian Belief network, i.e., a Bayesian Belief Network with continuous-valued variables, it has hitherto been very difficult to estimate the values for hidden variables based on observed evidence.

From the foregoing it will be apparent that there is a need for a method of application of General Bayesian Networks to oilfield operations so that observed data may be used to draw inferences regarding other variables in oilfield operations, thereby providing tools useful in the automation of oilfield operations.

BRIEF SUMMARY OF THE DISCLOSURE

In an embodiment of the present invention, a mechanism is provided for using General Bayesian Networks to automate oilfield operations by providing a mechanism by which continuous-valued hidden variables in a General Bayesian Network may be recomputed to reflect observed evidence data by weighting samples used in a Monte-Carlo approach for generating probability distribution functions for non-root variables in the General Bayesian Network by assigning weights such that samples that poorly reflect the observed data is given low weights and samples that provide a close prediction of observed data is given a high weight. The weighted samples are used to calculate probability distributions for non-observed variables.

In one embodiment, the present disclosure provides a method for operating an oilfield apparatus having at least one sensor for measuring a physical property corresponding to the operating of the oilfield apparatus, the method comprising:

modeling discrete-valued and continuous-valued variables relating to the operation of the oilfield apparatus as a Bayesian Network having nodes for both discrete-valued and continuous-valued variables;

using a Monte-Carlo approach to determine a plurality of sample vectors wherein the elements of each sample correspond to particular root variables in the Bayesian Network;

weighting the sample vectors using observed data from at least one of the at least one sensor for measuring a physical property to weight the sample vectors according to each sample vector's respective ability to predict observed data values;

recalculating probability distributions of the non-observed values based on the weighted sample vectors; and using the recalculated probability distributions to perform an automated action in an oilfield equipment operation.

BRIEF DESCRIPTION OF THE DRAWINGS

The present disclosure is described in conjunction with the appended figures.

Figure 1:
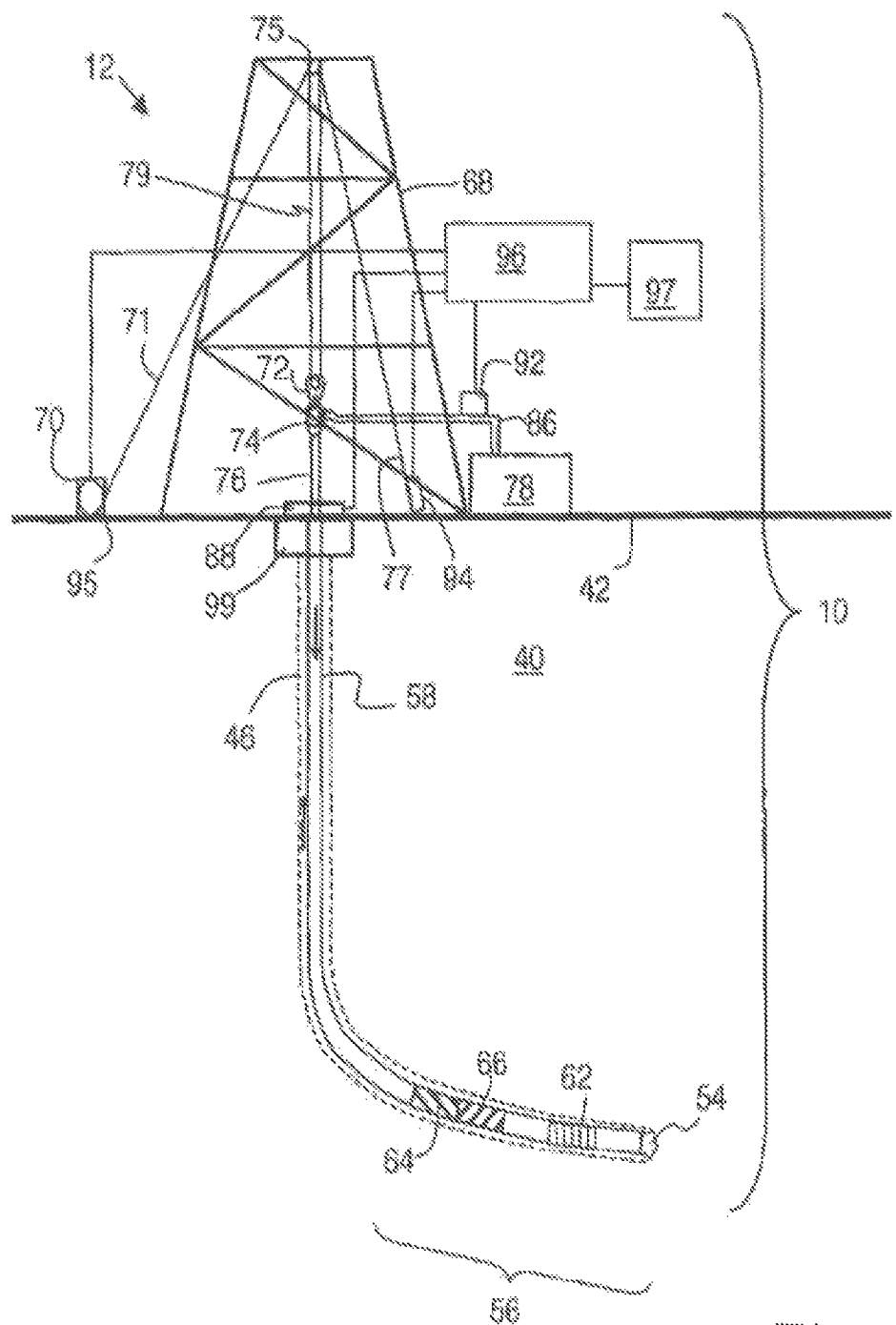
FIG. 1 is a schematic diagram illustrating a drilling process.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

It should also be noted that in the description provided herein, computer software is described as performing certain tasks. For example, we may state that a particular software module calculates probability density functions. That, of course, is intended to mean that a central processing unit executing the instructions included in the software module (or equivalent instructions) would perform the computation of the provided-for probability density function by appropriately manipulating data and data structures stored in memory and secondary storage devices controlled by the central processing unit. Furthermore, while the description provides for embodiments with particular arrangements of computer processors and peripheral devices, there is virtually no limit to alternative arrangements, for example, multiple processors, distributed computing environments, web-based computing. All such alternatives are to be considered equivalent to those described and claimed herein.

It should also be noted that in the development of any such actual embodiment, numerous decisions specific to circumstance must be made to achieve the developer's specific goals, such as compliance with system-related and business-related constraints, which will vary from one implementation to another. Moreover, it will be appreciated that such a development effort might be complex and time-consuming but would nevertheless be a routine undertaking for those of ordinary skill in the art having the benefit of this disclosure.

In this disclosure, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "computer-readable medium" includes, but is not limited to portable or fixed storage devices, optical storage devices, wireless channels and various other mediums capable of storing, containing or carrying instruction(s) and/or data.

In one embodiment of the invention, a system and method is provided that applies mechanisms for using General Bayesian Networks in the automation of oilfield operations.

FIG. 1 shows a drilling system 10 using a Bayesian Network interpretation system to automate aspects of the drilling system using Bayesian inference in a manner described in greater detail herein below. Drill string 58 is shown within borehole 46. Borehole 46 is located in the earth 40 having a surface 42. Borehole 46 is being cut by the action of drill bit 54. Drill bit 54 is disposed at the far end of the bottomhole assembly 56 that is attached to and forms the lower portion of drill string 58. Bottomhole assembly 56 contains a number of devices including various subassemblies. According to an embodiment of the invention measurement-while-drilling (MWD) subassemblies are included in subassemblies 62.

Examples of typical MWD measurements include direction, inclination, survey data, downhole pressure (inside the drill pipe, and outside or annular pressure), resistivity, density, and porosity. Also included is a subassembly 62 for measuring torque and weight on bit. The signals from the subassemblies 62 are preferably processed in processor 66. After processing, the information from processor 66 is communicated to pulser assembly 64. Pulser assembly 64 converts the information from processor 66 into pressure pulses in the drilling fluid. The pressure pulses are generated in a particular pattern which represents the data from subassemblies 62. The pressure pulses travel upwards though the drilling fluid in the central opening in the drill string and towards the surface system. The subassemblies in the bottomhole assembly 56 can also include a turbine or motor for providing power for rotating and steering drill bit 54. In different embodiments, other telemetry systems, such as wired pipe, fiber optic systems, acoustic systems, wireless communication systems and/or the like may be used to transmit data to the surface system.

The drilling rig 12 includes a derrick 68 and hoisting system, a rotating system, and a mud circulation system. The hoisting system which suspends the drill string 58, includes draw works 70, fast line 71, crown block 75, drilling line 79, traveling block and hook 72, swivel 74, and deadline 77. The rotating system includes kelly 76, rotary table 88, and engines (not shown). The rotating system imparts a rotational force on the drill string 58 as is well known in the art. Although a system with a kelly and rotary table is shown in FIG. 1, those of skill in the art will recognize that the present invention is also applicable to top drive drilling arrangements. Although the drilling system is shown in FIG. 1 as being on land, those of skill in the art will recognize that the present invention is equally applicable to marine environments.

The mud circulation system pumps drilling fluid down the central opening in the drill string. The drilling fluid is often called mud, and it is typically a mixture of water or diesel fuel, special clays, and other chemicals. The drilling mud is stored in mud pit 78. The drilling mud is drawn in to mud pumps (not shown), which pump the mud though stand pipe 86 and into the kelly 76 through swivel 74 which contains a rotating seal.

The mud passes through drill string 58 and through drill bit 54. As the teeth of the drill bit grind and gouges the earth formation into cuttings the mud is ejected out of openings or nozzles in the bit with great speed and pressure. These jets of mud lift the cuttings off the bottom of the hole and away from the bit 54, and up towards the surface in the annular space between drill string 58 and the wall of borehole 46.

At the surface the mud and cuttings leave the well through a side outlet in blowout preventer 99 and through mud return line (not shown). Blowout preventer 99 comprises a pressure control device and a rotary seal. The mud return line feeds the mud into separator (not shown) which separates the mud from the cuttings. From the separator, the mud is returned to mud pit 78 for storage and re-use.

Various sensors are placed on the drilling rig 10 to take measurement of the drilling equipment. In particular hookload is measured by hookload sensor 94 mounted on deadline 77, block position and the related block velocity are measured by block sensor 95 which is part of the draw works 70. Surface torque is measured by a sensor on the rotary table 88. Standpipe pressure is measured by pressure sensor 92, located on standpipe 86. Additional sensors may be used to detect whether the drill bit 54 is on bottom.

Signals from these measurements are communicated to a central surface processor 96. In addition, mud pulses traveling up the drillstring are detected by pressure sensor 92. Pressure sensor 92 comprises a transducer that converts the mud pressure into electronic signals. The pressure sensor 92 is connected to surface processor 96 that converts the signal from the pressure signal into digital form, stores and demodulates the digital signal into useable MWD data. According to various embodiments described above, surface processor 96 is programmed to automatically detect the most likely rig state based on the various input channels described.

Processor 96 is also programmed to carry out the automated event detection as described above. Processor 96 preferably transmits the rig state and/or event detection information to user interface system 97 which is designed to warn the drilling personnel of undesirable events and/or suggest activity to the drilling personnel to avoid undesirable events, as described above. In other embodiments, interface system 97 may output a status of drilling operations to a user, which may be a software application, a processor and/or the like, and the user may manage the drilling operations using the status.

Processor 96 may be further programmed, as described below, to interpret the data collected by the various sensors provided to provide an interpretation that may be used to automate operations of the drilling apparatus, provide status updates to an operator, and sound alarms when warranted based on the interpretations. Such interpretation may be used to understand the activities of a driller, to automate particular tasks of a driller, to provide suggested course of action such as parameter setting, trigger alarms and to provide training for drillers.

Figure 2:
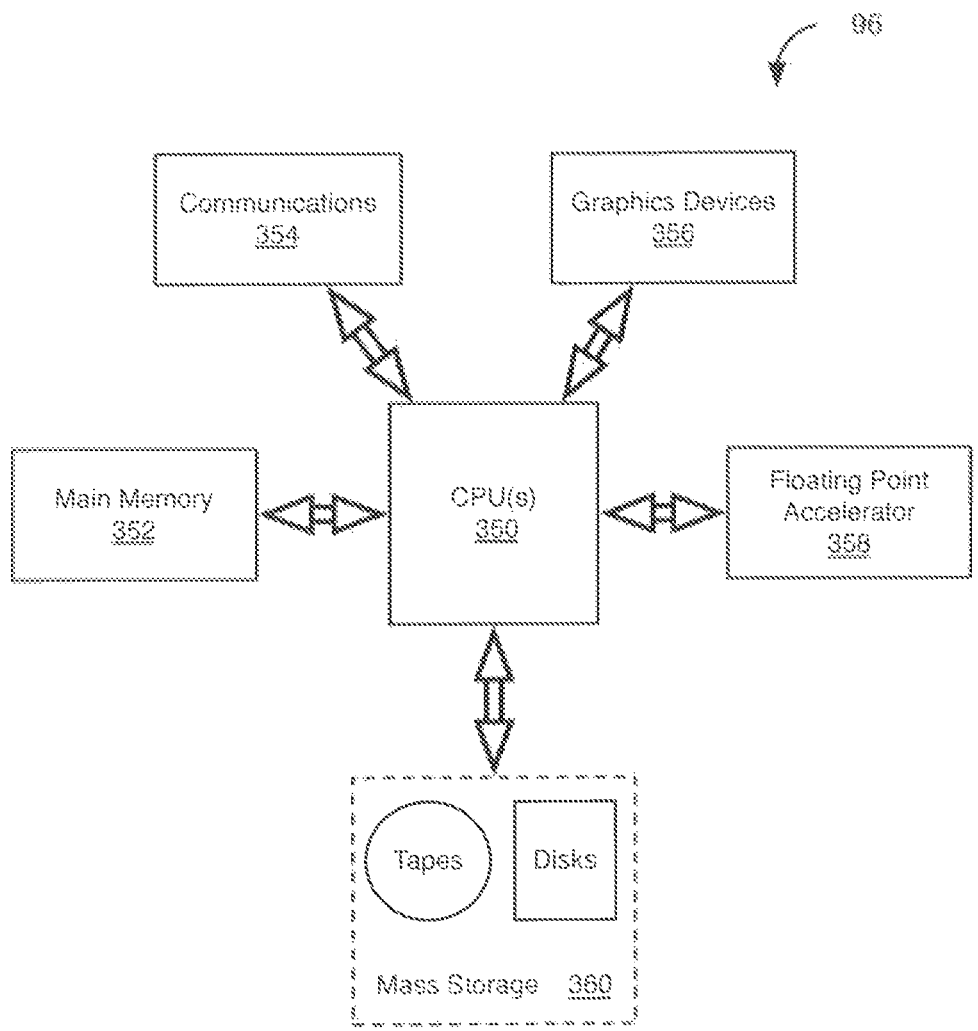
FIG. 2 shows detail of a processor for processing data to automate industrial processes, for example, the oilfield drilling processes as shown in FIG. 1, according to one embodiment of the present invention.

FIG. 2 shows further detail of processor 96, according to preferred embodiments of the invention. Processor 96 preferably consists of one or more central processing units 350, main memory 352, communications or I/O modules 354, graphics devices 356, a floating point accelerator 358, and mass storage such as tapes and discs 360. It should be noted that while processor 96 is illustrated as being part of the drill site apparatus, it may also be located, for example, in an exploration company data center or headquarters. It should be noted that many alternative architectures for processor 96 are possible and that the functionality described herein may be distributed over multiple processors. All such alternatives are considered equivalents to the architecture illustrated and described here.

In the hydrocarbon industry it is often desirable to automate, semi-automate or the like operations to remove, mitigate human error, to increase speed and/or efficiency, allow for remote operation or control, lessen communication obstacles and/or the like. Moreover, in the hydrocarbon industry sensors are commonly deployed to gather data to provide for monitoring and control of the systems related to hydrocarbon capture and/or the like.

In the process of drilling a borehole a plurality of sensors may be used to monitor the drilling process—including the functioning of the drilling components, the state of drilling fluids or the like in the borehole, the drilling trajectory and/or the like—characterize the earth formation around or in front of the location being drilled, monitor properties of a hydrocarbon reservoir or water reservoir proximal to the borehole or drilling location and/or the like.

Not all properties and conditions of an oilfield operation may be known by measuring properties using sensors. There may be certain conditions that simply are impossible to measure, other properties may be impractical to measure on a particular job because of failed equipment or simply not cost effective to measure. Yet, such unmeasured properties may be of vital interest to the operator of the oilfield apparatus, the cause to alter some parameter of an operation either through a recommendation from an automated system or by the equipment taking an automatic corrective action, or to indicate a condition meriting sounding an alarm.

Bayesian belief networks provide one mechanism for estimating values for unknown variables in a system based on knowledge of values for other variables and the relationships between variables. Traditionally, Bayesian Networks are applied to variables having discrete states. While many oilfield properties may take discrete values, e.g., whether a drilling operation is rotating or sliding, other properties are continuous-valued, e.g., pressures, torques, rate of penetration. Mechanisms for application of Bayesian Networks including continuous-valued properties to the automation of the operation of oilfield apparatuses are described herein below.

Figure 3:
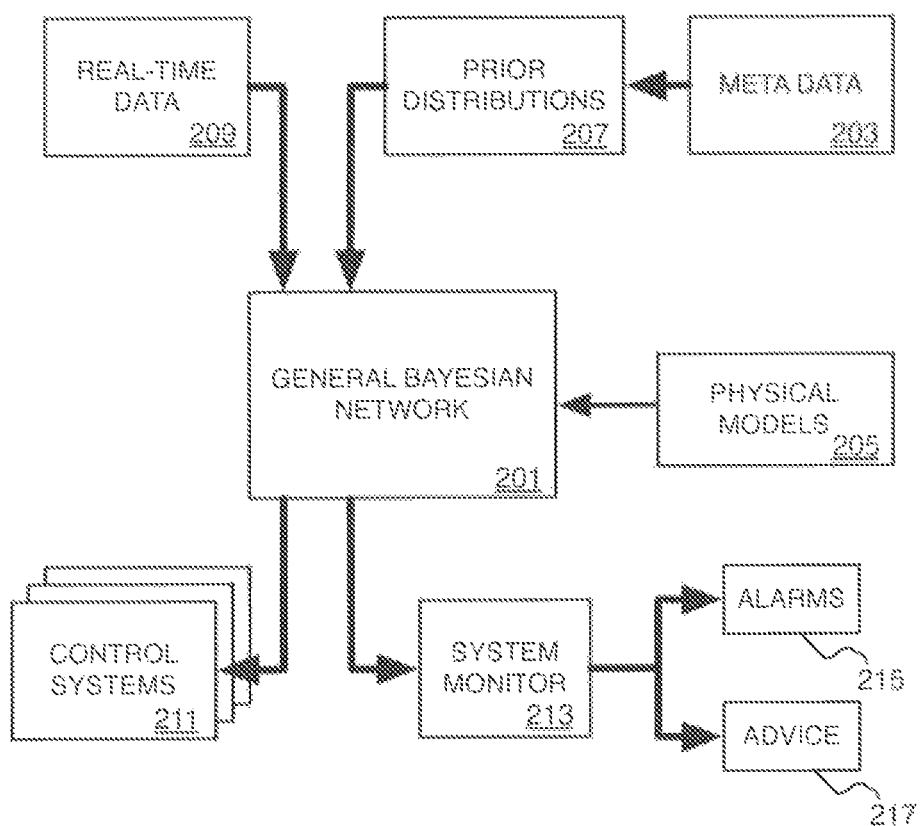
FIG. 3 is a block diagram illustrating the data flow of meta data useful in determining prior distributions of root variables of a Bayesian Network, physical models that may relate various variables in a Bayesian Network, real-time data used as evidence and the use of the evidence to obtain outputs from the Bayesian Network to allow for use in an automation of operations such as the drilling process of FIG. 1, in accordance with an embodiment of the present invention.

FIG. 3 is a block diagram illustrating the data flow of meta data useful in determining prior distributions of root variables of a Bayesian Network, physical models that may relate various variables in a Bayesian Network, real-time data used as evidence and the use of the evidence to obtain outputs from the Bayesian Network to allow for use in an automation of operations such as the drilling process of FIG. 1. A General Bayesian Network 201 is constructed (as described in greater detail below) from meta data 203 describing particular properties of an oilfield operational system and physical models 205 relating various variables in an oilfield operational system. When we use the term oilfield operational system herein, we mean the system that includes the oilfield apparatus itself and the physical environment in which it may operate. Thus, the oilfield operational system includes operating parameters as well as physical conditions in a borehole, for example.

Figure 4:
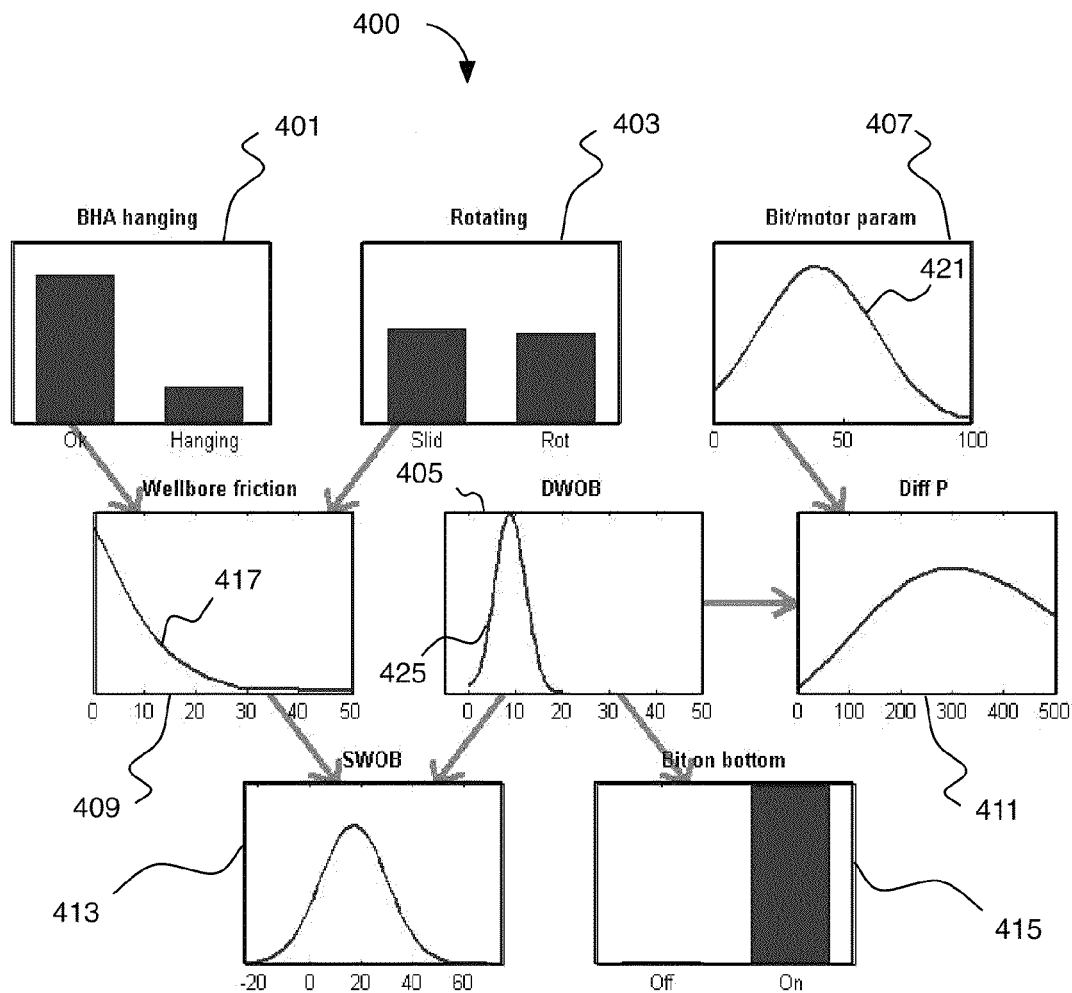
FIG. 4 is an example Bayesian Network showing the prior probability distributions applied to root variables and probability distributions calculated using a Monte-Carlo approach as described in conjunction with FIG. 5, in accordance with an embodiment of the present invention.

The meta data 203 may be used to determine prior probability distributions 207 for various variables in the oilfield operational system. Consider the Bayesian Network 400 illustrated in FIG. 4. Each node, e.g., nodes 401 through 415 in the illustration in FIG. 4 of a Bayesian Network represents the probability for each value given along horizontal axis of the node. The probability values in each case are reflected by the vertical axis and represent probabilities in the range of 0.0 to 1.0. More specifically, for each node in FIG. 4, the area under the depicted curve or the sum of the histogram values is 1.0. Consider the Rotating variable 403. This variable may take on the discrete values Sliding and Rotating. It may be known that in a particular operating environment—e.g., defined by geography, lithology, operating company, or equipment used—that drilling operations Sliding and Rotating occur/proceed equally often. This condition is illustrated in FIG. 4 for the Rotating variable 403 in which the prior distribution is 0.5 for each value of the Rotating variable 403. In another operating environment, the meta data 203 may indicate a different distribution between the Sliding and Rotating values.

Now the continuous-valued variable DWOB (Downhole Weight On Bit) 405 is considered. The downhole weight on bit is a property that is continuous-valued illustrated by the curve 425. In the schematic of FIG. 4, DWOB may take on values in the range −5 to 50 tons. The meta-data 203 resulting in the probability distribution illustrated for the DWOB variable 405 is essentially a Normal distribution centered around 10 tons with very short tails terminating at 0 and 20 tons, respectively.

Merely by way of example, a General Bayesian Network 400 applied to well construction procedure is shown in FIG. 4. In the example depicted in FIG. 4, the variables involved are:

| | | |
|---|---|---|
| BHA hanging 401 | Whether the BHA is hanging up | Discrete distributions of two states (yes or no) |
| Rotating 403 | Whether the BHA is rotating | |
| Bit on bottom 415 | Whether the bit is on bottom | |
| SWOB 413 | Weight on bit measured at the surface | |
| DWOB 405 | Downhole (true) weight on bit | |
| Diff P 411 | Motor differential pressure ($\Delta P_M$) | Continuous-valued |
| Bit/motor param 407 | Bit-motor parameter | |
| Wellbore friction 409 | Wellbore friction | |

With regard to FIG. 3, the nodes in the Bayesian Network 201 are related by physical models 205. Considering the example Bayesian Network 401 of FIG. 4, which is a model for well construction procedure, the directed links linking the nodes 401 through 415 represent functional relationships relating the values of a variable corresponding to one node to variables corresponding to other nodes. Thus, the physical models 205 may be used to define these functional relationships.

Merely by way of example, for the General Bayesian Network 400 of FIG. 4, the functional relationships are as follows:

$$SWOB\ 413 = DWOB + \text{Wellbore friction}$$

$$Diff\ P\ 411 = DWOB \times \text{Bit-motor parameter}$$

$$\text{Bit on bottom } 415 = \text{True if } DWOB > 0.5$$

$$\text{Wellbore friction } 409 = \begin{cases} \text{Close to zero if rotating} \\ \text{Higher if sliding} \\ \text{Even higher if } BHA \text{ hanging} \end{cases}$$

Prior probability distributions for the non-root nodes (i.e., nodes that depend from other nodes through the defined functional relationships; in the example General Bayesian Network 400, nodes 409, 411, 413, and 415) may be computed in accordance with an embodiment of the present invention using a Monte-Carlo method illustrated in and described in conjunction with the flow-chart of FIG. 5, which is discussed in greater detail herein below.

In one embodiment, the General Bayesian Network 201 which is built from the prior distributions 207 and physical models 205 is used to perform reasoning based on real-time data observations 209 of variables in the General Bayesian Network 201, also referred to as evidence. The evidence is used in the General Bayesian Network to provide probability density functions for observed variables taking into account such measured data and any uncertainties. The probability density functions relating to the evidence is then used, as described herein below in greater detail in conjunction with the flow-chart of FIG. 6 and examples of FIGS. 7 through 9, to update the probability density functions of other variables to conform to the probability density functions of the evidence thereby providing the possibility for reasoning with respect to the hidden variables based on the observed data.

The evidence based results from the General Bayesian Network 201 may then be used as input to control systems 211 to enable the control systems 211 to take an automated action based on the probability distribution function of variables in the General Bayesian Network 201, as input to a system monitor 213 to provide advice 215 to an operator, e.g., in the form of probability density functions for hidden (non-observed variables), to provide for sounding an alarm(s) 217 for undesirable conditions where the probability density function for a particular variable indicates a high probability of the undesirable condition and/or another automation-type application.

Returning now to the process of constructing the General Bayesian Network 201, e.g., the example General Bayesian Network 400 of FIG. 4. FIG. 5 is a flow chart illustrating a process 500 of generating a General Bayesian Network according to one embodiment by using a Monte-Carlo approach to generate prior probability distributions for non-root variables of the Bayesian Network 201.

A General Bayesian Network ("GBN") 201 is a tool for modeling the variables of a system, their uncertainties and their relative dependencies. Suppose the system in question is described by J variables, each identified by $x_j$, where $j \in \{1, \ldots,$ J}. Some of these variables are observable (directly measured) while others are hidden. Merely by way of example as relates to wellbore operations/construction, observable variables may include standpipe pressure, flow rate, hookload, drillstring revolutions per minute ("RPM"), block position and/or the like. Merely by way of example as relates to wellbore operations/construction, hidden variables may include weight on the bit, cuttings load, wellbore friction, drilling efficiency, trajectory control parameters, the likelihood of an undesirable event such as a kick, lost circulation or stuck pipe, and/or the like.

In a GBN 201, each node of the GBN 201 represents a variable of the system. In the GBN 201, directed links between the nodes represent dependence between the variables. Dependents of a node are referred to as the children of the node and other nodes that influence a particular node are referred to as parents.

As described herein above, the process of constructing the Bayesian Network 201 starts with the assignment of prior probability distributions $PDF_j$ for each root node of the General Bayesian Network 201, step 501. For nodes that have no parents (referred to as root nodes), par(j) is empty and the PDF that is required, $p(x_j)$, represents the prior knowledge for the parentless variables. For example, it might be known that drillstring RPM has no parent variables (for example, the RPM may be directly set by the driller operating the drilling procedure), is always positive and is unlikely to be above 500. In this case, in an aspect of the present invention, $p(x_j)$ may be a uniform distribution between 0 and 500.

Next, building a GBN 201 involves specifying the relationship between any node and its parents, step 503, which in an embodiment of the present invention is given as a conditional probability density function (PDF): $p(x_j | x_{par(j)})$, where par(j) is the list of parents of node j. This conditional PDF is derived from the function that relates $x_j$ to its parents. For example, with regard to borehole operation/construction, the downhole weight on the bit (DWOB)—where the bit is a drill bit for drilling through an earth formation—might be the sum of the weight seen at the surface, the surface weight on bit (SWOB), and frictional losses in the wellbore (FF). In this case $p(DWOB|SWOB,FF)=N(SWOB+FF, \sigma_{DWOB}^2)$ where $N(\mu, \sigma^2)$ is a Gaussian distribution of mean $\mu$ and variance $\sigma^2$, and $\sigma_{DWOB}$ represents the amount of uncertainty in the model.

In one embodiment of the present invention, the GBN 201 is totally defined by the list of parents and the conditional PDF for each node. As noted above, for nodes with no parents, also known as root nodes, prior knowledge may be used to determine the PDF for the node.

To determine the non-root node probability functions, in one embodiment, a Monte-Carlo method is used. A plurality of sample vectors X is arbitrarily determined such that for each sample vector X a value is assigned for each root variable j, step 505. These samples, are given arbitrary distributions yet constrained to conform to the probability density function for the root variable j. For example, consider the example of FIG. 4, the root variable DWOB of node 405 has a normal distribution centered around 10 tons. The values for the sample vector component corresponding to DWOB are made to conform to that distribution. Similarly, the distribution for BHA hanging 401 is approximately 0.8 for OK and 0.2 for Hanging. Thus, the values for the sample vector corresponding to DWOB is such that 80% of the samples have the value OK and 20% have the value Hanging.

In such an embodiment, $x_{j,n}$ may be the n-th sample of the variable $x_j$, $X_n$ may be the stacked vector of the n-th sample for all variables of the network.

For each, non-root sample, the values $x_{j,n}$ of the generated sample vectors are used to calculate probability density distributions for the non-root variables by propagating the values through the GBN 201 using the functional relationships, step 507.

Figure 5:
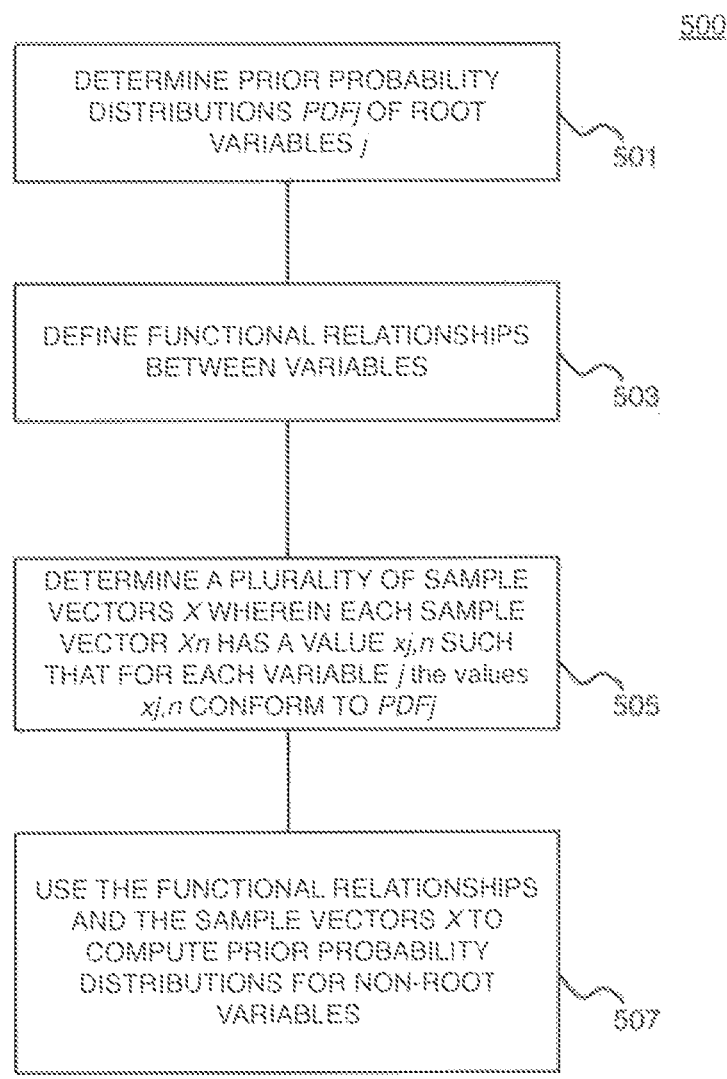
FIG. 5 is a flow chart illustrating the steps involved in a Monte-Carlo approach to compute prior probability distributions for non-root variables in a Bayesian Network such as the Bayesian Network illustrated in FIG. 4, in accordance with an embodiment of the present invention.

The result from the process 500 of FIG. 5 is reflected in the example of FIG. 4. For example, given the prior probabilities for BHA hanging 401 and Rotating 403, the prior probability distribution for wellbore friction 409 is determined to follow the curve 417 having a hyperbolic shape with a high probability near 0, i.e., high probability of low friction, and a low probability over 30, i.e., a low probability of high friction. This probability density function for Wellbore friction is propagated and combined with the prior probabilities for DWOB 405 to compute prior probabilities of SWOB 413 which is normal distribution centered around 20.

Figure 6:
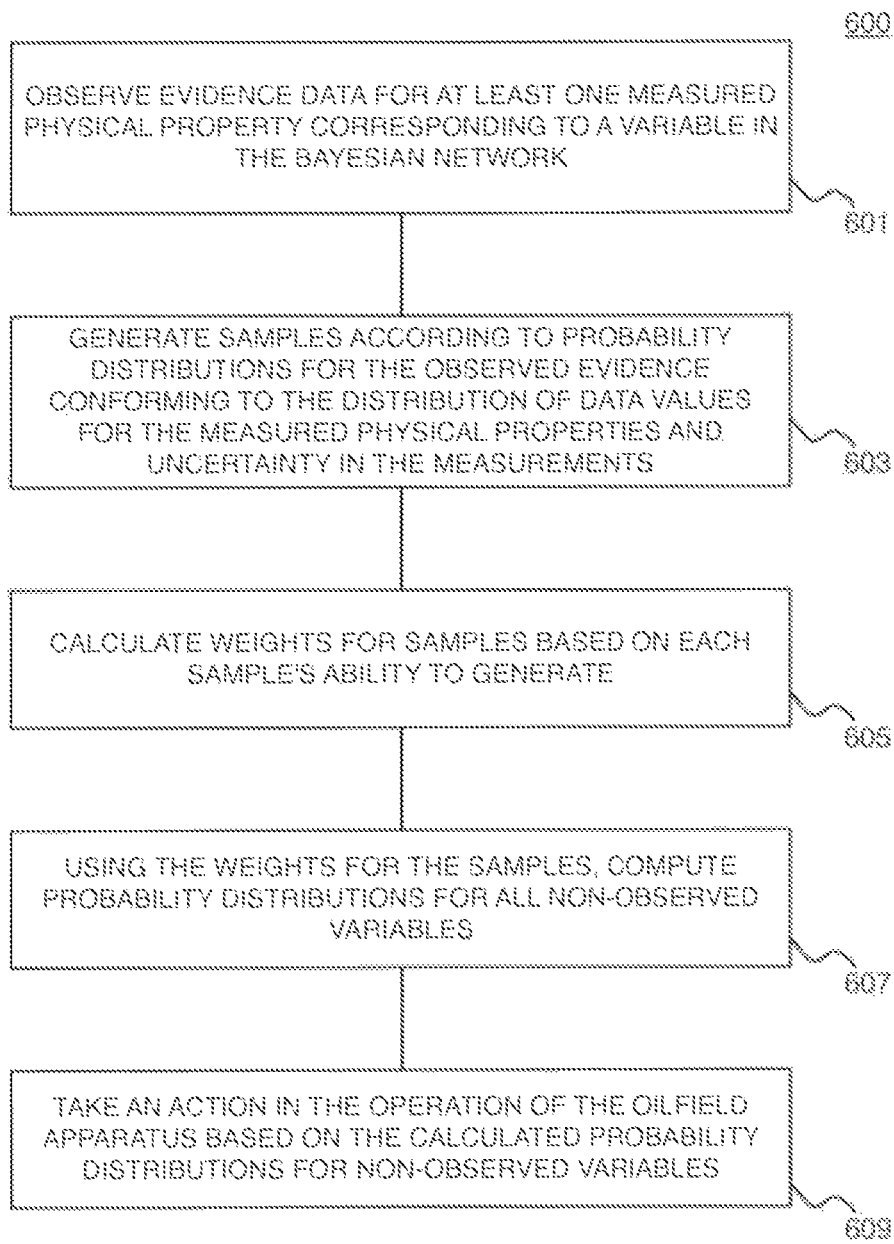
FIG. 6 is a flow chart illustrating the steps involved in using evidence observed in the form of measured physical data corresponding to variables in a Bayesian Network to compute posterior probability distributions for non-observed variables reflecting observed measured data, i.e., evidence, and using such computed probability distributions to take an action in the operation of an oilfield apparatus, in accordance with an embodiment of the present invention.

To automate some aspect of the operation of an oilfield apparatus, observed values, evidence, is used with the GBN 201 to determine probability density functions for non-observable variables, i.e., posterior probabilities for non-observable variables. FIG. 6 is a flow chart illustrating the steps of a process 600 for using the evidence with the GBN 201 to determine probability density functions for the non-root variables and using such inferred values to automate some aspect of an oilfield operation.

Evidence data, i.e., observed data, for at least one measured physical property corresponding to a variable in the GBN 201 is collected, step 601, and used to determine samples conforming to an appropriate probability distribution corresponding to the observed data, step 603. One method of generating the samples in accordance with an embodiment of the present invention is as follows. When a variable is observed during a wellbore procedure, the N samples of the variable may be drawn from the measurement distribution, which measurement distribution may also be referred to as the evidence—where the form of the measurement distribution is a function of the measurement uncertainty. In an aspect of the present invention, when a variable is hidden, the samples may be drawn from the conditional PDF. In this case, the n-th sample is drawn from a PDF conditioned on the n-th samples from the variable's parents. If a root node is hidden, the N samples may be drawn from the root node's prior distribution. In certain aspects, nodes may be processed in topological order, that is, merely by way of example, by first sampling from the distributions of the variables at the root nodes, then those with only root nodes as parents, and so on.

Given the sample probability distributions for the observed data from step 603, weights are assigned to the various samples $X_n$, step 605. In accordance with certain embodiments of the present invention, weights for each sample $X_n$ may be processed according to the following method. At each observed node, the conditional PDF for each of the N sampled values may be evaluated, where the conditional PDF is conditioned on the N samples from the node's parents. This provides the likelihood of a given sample, $x_{j,n}$, of the measurement of a given variable. The resulting weight, $w_n$, is the product of these likelihoods across all observed variables. That is, $$w_n = \prod_{j \in e} p(x_{j,n} | x_{par(j),n})$$

where e is the list of observed nodes.

Given the computed weights and the sample vectors X, the non-observed nodes may be re-calculated to reflect the given evidence, step 607. In some embodiments, the samples $x_{j,n}$ may be drawn from the distribution of each variable, $p(x_j)$, in which case $w_n = p(x_n)$. In alternative embodiments, the samples may be drawn from another distribution, $q(x_j)$. In such embodiments, the weights may be provided by the following: $w_n = p(x_n)/q(x_n)$.

Figure 7:
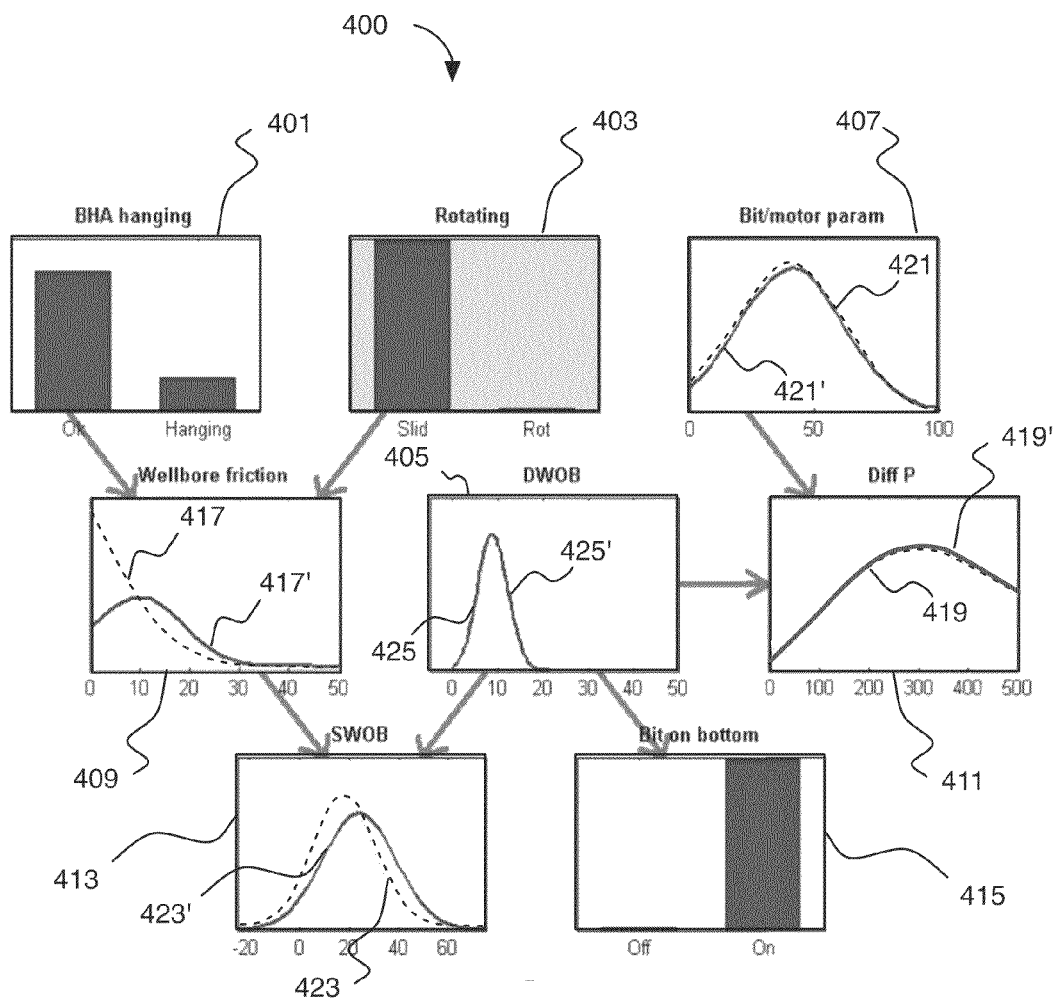
FIGS. 7 through 9 are schematics illustrating changes to the example Bayesian Network of FIG. 4 as different evidence is presented to the Bayesian Network, in accordance with an embodiment of the present invention.
Figure 8:
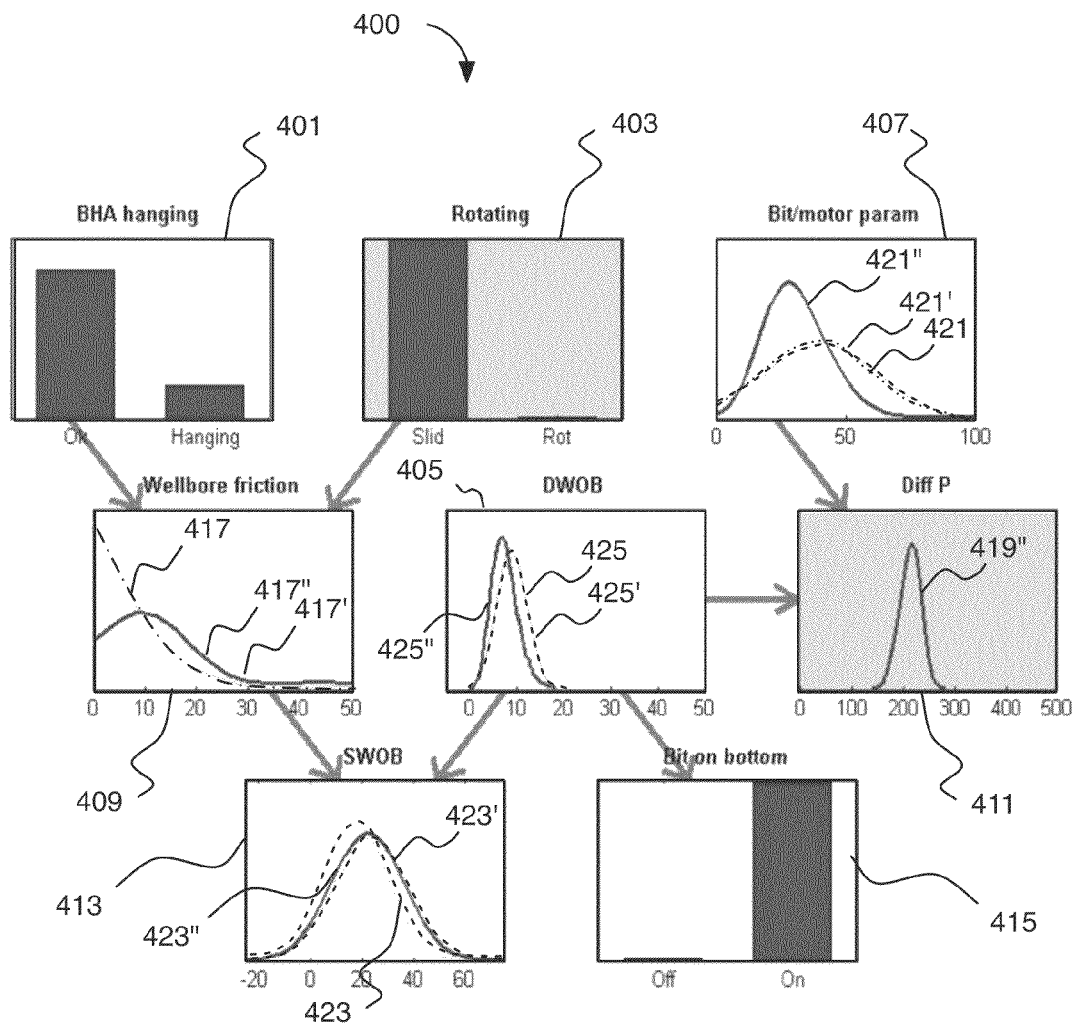
Figure 9:
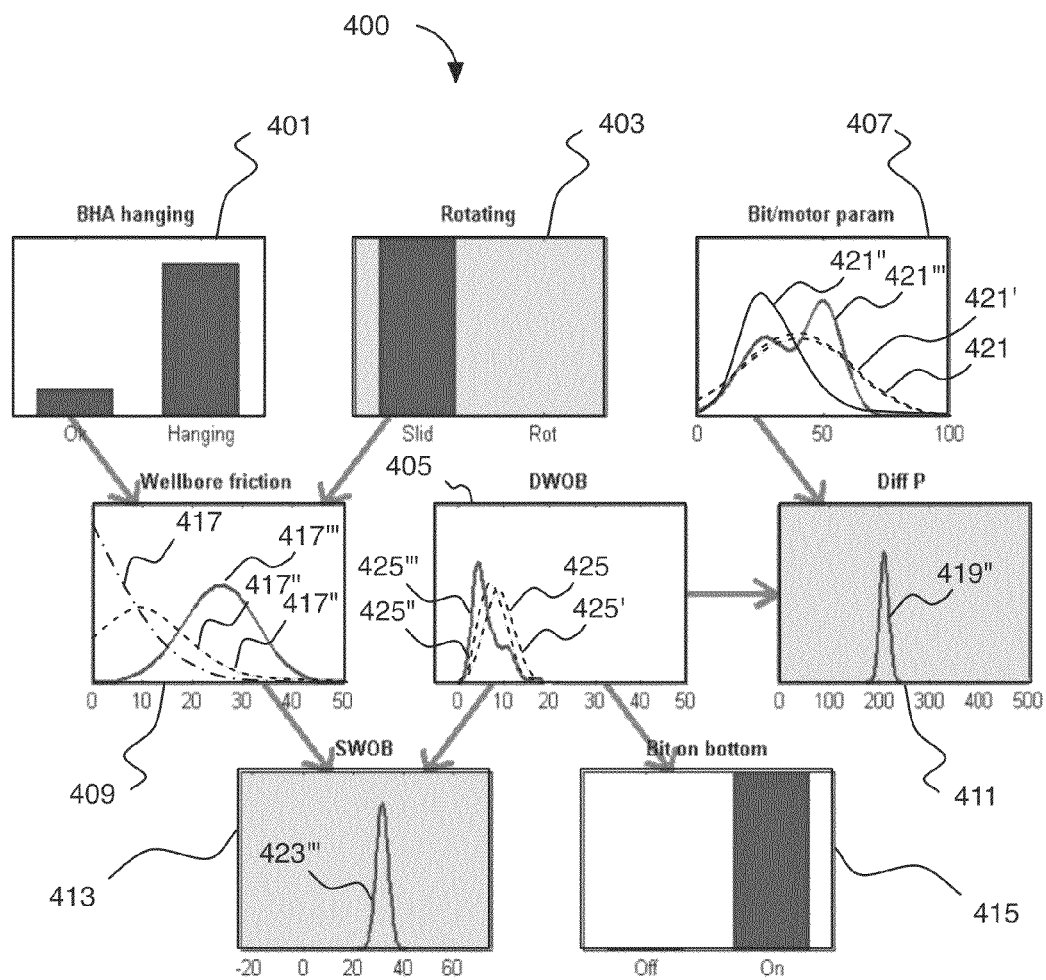
Figure 10:
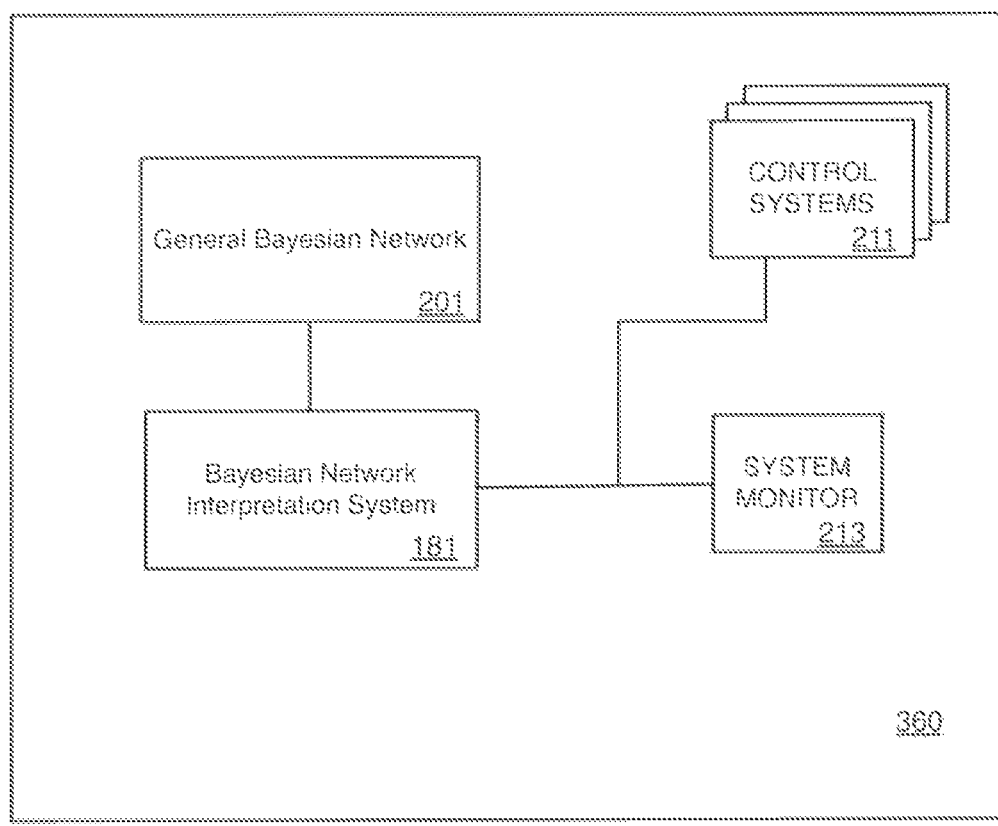
FIG. 10 is a block diagram illustrating an example of some software and data modules stored in storage media connected to a processor for processing data to automate industrial processes according to the embodiments described herein.

FIGS. 7 through 9 illustrate the GBN 400 updated with a succession of observed variables. Note that in FIGS. 7 through 9, nodes that represent observed variables are shaded where as hidden variables remain white. In FIG. 7, the prior probability density functions for the non-observed variables are shown as dashed curves 417 through 425, respectively. These correspond to the probability distributions illustrated in FIG. 4 in which no evidence data has been applied. In the example of FIG. 7, observed data is provided for the Rotating variable 403 showing a near certainty that the drilling operation is proceeding sliding rather than rotating. As can be seen, the evidence of not rotating significantly affects the estimate of Wellbore friction and SWOB. As the Wellbore friction variable 417 is functionally related to the Rotating variable 403, the probability density function is altered into the curve (solid) 417'. This change in the curve further result in changes to the probability distribution function for the SWOB variable as shown by the solid curve 423' as the probability distribution 417' is propagated to the SWOB noted 413 by virtue of weighting samples in which Rotating=Slid more heavily than samples in which Rotating=Rot conforming with the evidence that the operation is proceeding sliding. Because changes in the Rotating variable have very little influence over variables not dependent thereon, the changes to the Bit/motor param node 407, DWOB node 405, Diff P node 411 and Bit on bottom node 415 are minimal. Therefore, the curves for the corresponding probability density functions, i.e., curve 421', 425', and 419', are nearly identical to the curves 421, 425, 419 which reflect the distributions without the added evidence.

In FIG. 8, observed data is also provided for Diff P 411, specifically, the observed data may comprise a measured pressure drop across the motor. As values measured on the sensor vary during the course of data collection and as there may be some uncertainty in the accuracy of the measurement, the measured value is modeled as a probability density function 419" that reflects the variation in the measurements and the uncertainty in the measurements. The updated probability density functions that reflect this added evidence are depicted as solid curves and provided reference numerals nnn" where nnn is the reference numeral for the corresponding distribution without any evidence, and nnn' is the reference numeral for the corresponding distribution with only the Rotating value evidence as shown in FIG. 7.

As Diff P 411 depends on values for Bit/motor param 407 and DWOB 405, the distributions for those variables are also updated. SWOB 413 depends on DWOB 405 and is similarly updated as a function of the shift in the probability distribution for DWOB 405. The added evidence of $\Delta P_M$ 411 most significantly changes the Bit-motor parameter 407 as noted by the relatively dramatic difference between the probability density distribution 421" and its corresponding predecessors 421' and 421; however all variables of the network are updated to ensure their estimated distributions take into consideration all evidence and prior information from the entire network.

FIG. 9 illustrates a further example in which SWOB 413 is measured to be 35 tons with a standard deviation of 2 tons illustrated by the probability density distribution depicted as the solid curve 423'. This value is significantly higher than the previous estimate of SWOB (illustrated as probability density distribution 423" of FIG. 8). The explanation of this increase is that reflected by the recalculation of weights for the samples $X_n$, the distribution of wellbore friction 409 also increases (solid curve 417'''), which, in turn, suggests it is more likely that the BHA is hanging (note the difference in the histograms for node 401 in FIG. 9 and FIG. 8). The change in SWOB 413 also causes the estimate of DWOB 405 to decrease slightly (solid curve 425''', although this value is more constrained by the evidence at $\Delta P_M$ 411. Accordingly, the interaction between some of the variables and the inferences that may be made between variables illustrate how some embodiments of the present invention provide for using Bayesian Networks to automatically understand/control a wellbore procedure or the like.

Returning now to the flow-chart 600 of FIG. 6, the updated probability distributions are used to take an action in the operation of the oilfield apparatus based on the calculated probability distributions for non-observed variables, step 609. This action is performed, for example, by feeding the calculated probability distributions from the GBN 201 to control systems 211 or system monitoring equipment 213 illustrated in FIG. 3. The control systems 211 may, for example, contain rules that if a probability of a particular value is above a certain threshold, adjusting certain drilling parameters. Similarly, system monitoring equipment 213 may include rules that if a probability of a particular value is above a certain threshold, sound an alarm 215 or provide some advice 217 to an operator.

The data and operations described herein above may, in one embodiment, be stored in a mass storage device 360 (FIG. 2). The mass storage device may include the General Bayesian Network 201, the control systems 211, and system monitor control software 213. The mass storage device may further include a Bayesian Network interpretation system 181. The Bayesian Network interpretation system 181 may include software instructions to cause the processor 350 to perform the operations described herein above, for example, in conjunction with FIGS. 5 and 6.

From the foregoing it will be apparent that in an embodiment of the present invention a mechanism is provided for using General Bayesian Networks to automate oilfield operations by providing a mechanism by which continuous-valued hidden variables in a General Bayesian Network may be recomputed to reflect observed evidence data by weighting samples used in a Monte-Carlo approach for generating probability distribution functions for non-root variables in the General Bayesian Network by assigning weights such that samples that poorly reflect the observed data is given low weights and samples that provide a close prediction of observed data is given a high weight. The weighted samples are used to calculate probability distributions for non-observed variables.

Although specific embodiments of the invention have been described and illustrated, the invention is not to be limited to the specific forms or arrangements of parts so described and illustrated.

The invention claimed is:

1. A method for operating an oilfield apparatus having at least one sensor for measuring a physical property corresponding to the operating of the oilfield apparatus, the method comprising:

modeling discrete-valued and continuous-valued variables relating to the operation of the oilfield apparatus as a Bayesian Network having nodes for both discrete-valued and continuous-valued variables;

using a Monte-Carlo approach to determine a plurality of sample vectors wherein the elements of each sample correspond to particular root variables in the Bayesian Network, and wherein determining the plurality of sample vectors comprises assigning, for a probability density function for each observed variable, samples that conform to a distribution of observed variables and as a function of uncertainty of the observed measurements;

weighting the sample vectors using observed data from at least one of the at least one sensor for measuring a physical property to weight the sample vectors according to each sample vector's respective ability to predict observed data values;

recalculating probability distributions of the non-observed values based on the weighted sample vectors; and using the recalculated probability distributions to perform an automated action in an oilfield equipment operation.

2. The method for operating an oilfield apparatus having at least one sensor for measuring a physical property corresponding to the operating of the oilfield apparatus of claim 1 wherein the step of using a Monte-Carlo approach to determine a plurality of sample vectors comprises:

assigning the distribution of values for each element to conform to known prior probability distributions for each root variable.

3. The method for operating an oilfield apparatus having at least one sensor for measuring at least one physical property relating to the operation of the oilfield apparatus of claim 1, wherein at least one variable is a continuous-valued variable.

4. The method for operating an oilfield apparatus having at least sensor for measuring at least one physical property relating to the operation of the oilfield apparatus of claim 1, wherein the step of weighting the sample vectors comprises weighting the sample vectors such that samples that closely correspond to the observed measured data is assigned a high weight and samples that poorly correspond to the observed measured data is assigned a low weight.

5. The method for operating an oilfield apparatus having at least sensor for measuring at least one physical property relating to the operation of the oilfield apparatus of claim 4, wherein the weighting the sample vectors such that samples that closely correspond to the observed measured data is assigned a high weight and samples that poorly correspond to the observed measured data is assigned a low weight comprises:

for each observed variable, determining the likelihood $p(x_{j,n}|x_{par(j),n})$ of given sample value $x_{j,n}$, where n is an index defining a sample vector X and j is the variable index within the sample vector X, by determining the conditional probability density function for each sample $X_j$ conditioned on the sample value $x_{par(j),n}$ of each parent variable; and computing the weight, $w_n$, of each sample n as the product of the likelihoods across all observed variables, namely, $$w_n = \prod_{j \in e} p(x_{j,n} | x_{par(j),n})$$

where e is the set of observed variables.

6. The method for operating an oilfield apparatus having at least sensor for measuring at least one physical property relating to the operation of the oilfield apparatus of claim 1 wherein the step of using the recalculated probability distributions to perform an automated action in an oilfield equipment operation comprises actions selected from sounding an alarm if a probability of a variable exceeding a predefined value rises over a specified threshold, adjusting an operating parameter in response to a probability of a variable exceeding a predefined value, and providing an operator of the oilfield advice in regard to probability distributions for values of non-observable variables.

7. An automated oilfield apparatus, comprising:

at least one sensor for measuring at least one physical property relating to the operation of the oilfield apparatus;

a processor connected to the at least one sensor;

a storage system connected to the processor and for storing data and instructions executable by the processor, the instructions including instructions to cause the processor to:

model discrete-valued and continuous-valued variables relating to the operation of the oilfield apparatus as a Bayesian Network having nodes for both discrete-valued and continuous-valued variables;

use a Monte-Carlo approach to determine a plurality of sample vectors wherein the elements of each sample correspond to particular root variables in the Bayesian Network;

weighting the sample vectors using observed data from at least one of the at least one sensor for measuring a physical property to weight the sample vectors according to each sample vector's respective ability to predict observed data values, wherein the instructions to weight the sample vectors comprises instructions to weight the sample vectors such that samples that closely correspond to the observed measured data are assigned a high weight and samples that poorly correspond to the observed measured data are assigned a low weight, and wherein the instructions to weight the sample vectors provide that:

for each observed variable, determine the likelihood $p(x_{j,n}|x_{par(j),n})$ of given sample value $x_{j,n}$, where n is an index defining a sample vector X and j is the variable index within the sample vector X, by determining the conditional probability density function for each sample $X_j$ conditioned on the sample value $x_{par(j),n}$ of each parent variable; and compute the weight, $w_n$, of each sample n as the product of the likelihoods across all observed variables, namely, $$w_n = \prod_{j \in e} p(x_{j,n} | x_{par(j),n})$$

where e is the set of observed variables;

recalculate probability distributions of the non-observed values based on the weighted sample vectors; and using the recalculated probability distributions to perform an automated action in an oilfield equipment operation.

8. The automated oilfield apparatus oilfield apparatus of claim 7, wherein the instructions to use a Monte-Carlo approach to determine a plurality of sample vectors comprises instructions to assign the distribution of values for each element to conform to known prior probability distributions for each root variable.

9. The automated oilfield apparatus oilfield apparatus of claim 7, wherein at least one variable is a continuous-valued variable.

10. The automated oilfield apparatus oilfield apparatus of claim 7, wherein the instructions to weight the sample vectors comprises instructions to weight the sample vectors such that samples that closely correspond to the observed measured data is assigned a high weight and samples that poorly correspond to the observed measured data is assigned a low weight.

11. The automated oilfield apparatus of claim 7, wherein the instructions to determine sample vectors comprises instructions to assign, for a probability density function for each observed variable, samples that conform to a distribution of observed variables and as a function of uncertainty of the observed measurements.

12. The automated oilfield apparatus oilfield apparatus of claim 7, wherein the instructions to use the recalculated probability distributions to perform an automated action in an oilfield equipment operation comprises actions selected from sounding an alarm if a probability of a variable exceeding a predefined value rises over a specified threshold, adjusting an operating parameter in response to a probability of a variable exceeding a predefined value, and providing an operator of the oilfield advice in regard to probability distributions for values of non-observable variables.

* * * * *